March 5, 1957 E. J. MEYER ET AL 2,783,675
OPTICAL ANGLE MEASURING DEVICE
Filed March 25, 1953 3 Sheets-Sheet 1
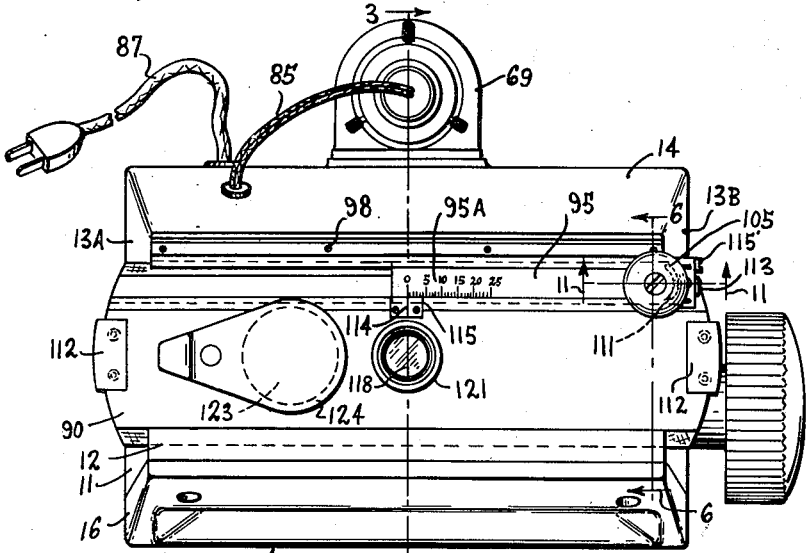
Fig. 1
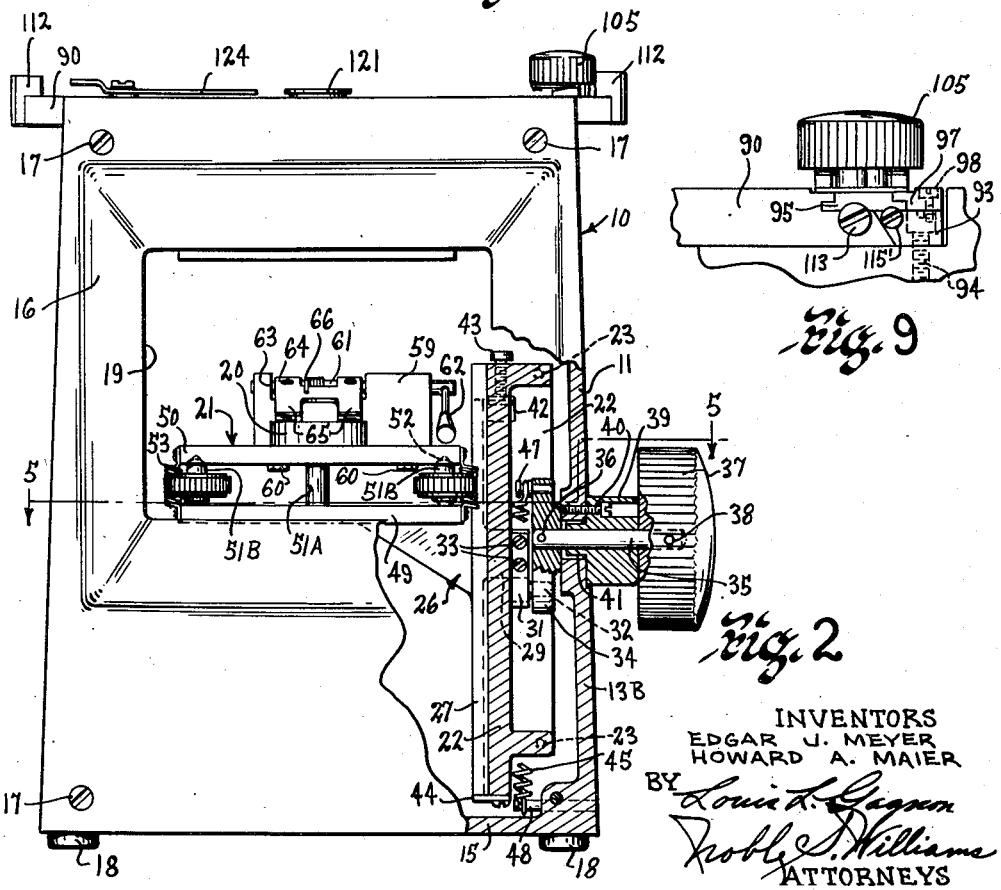
Fig. 9
Fig. 2
INVENTORS
EDGAR J. MEYER
HOWARD A. MAIER
BY
ATTORNEYS

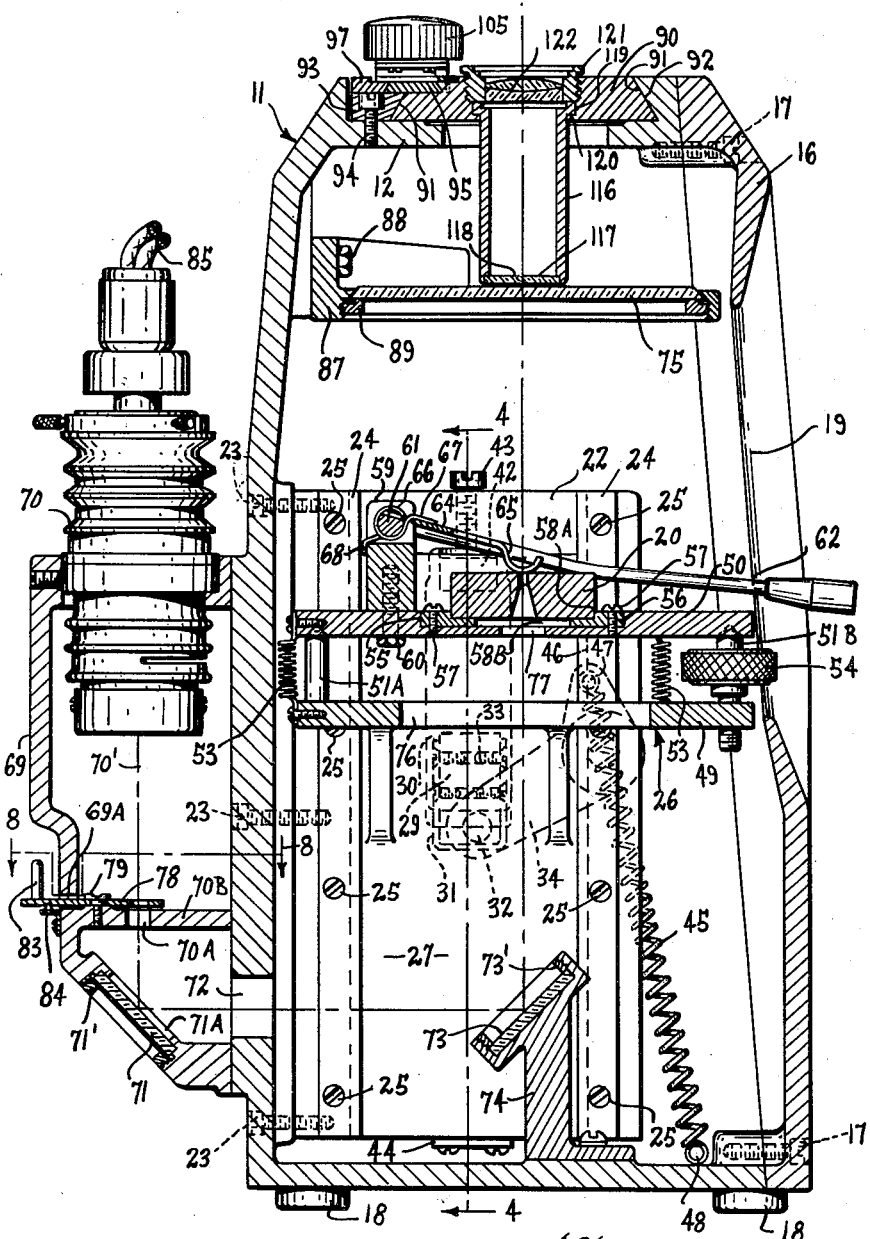
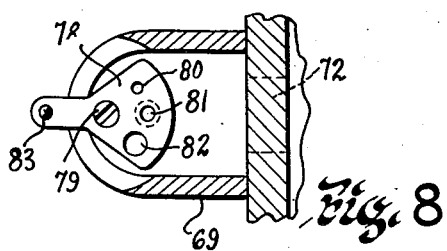

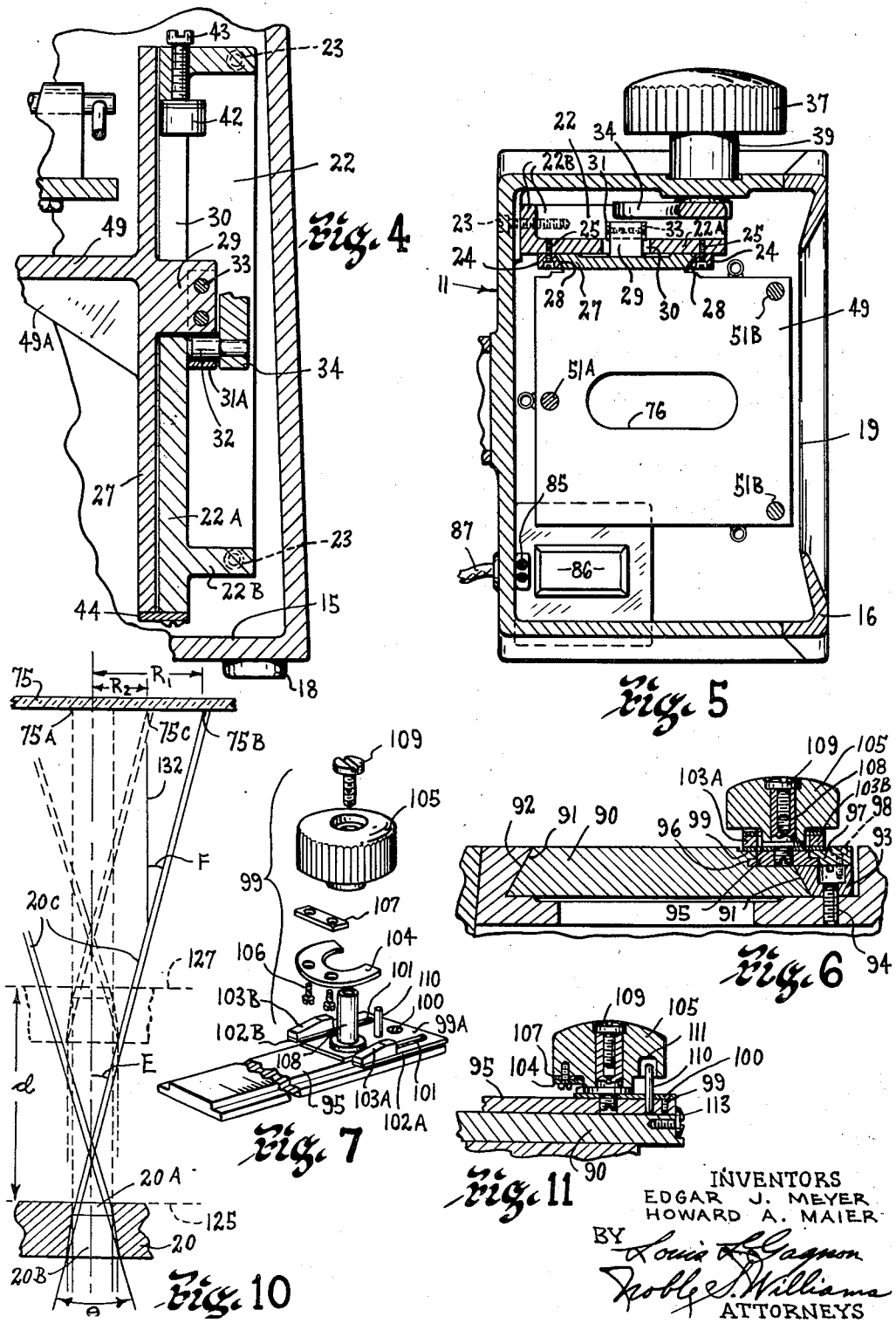

United States Patent Office 2,783,675
Patented Mar. 5, 1957

2,783,675

OPTICAL ANGLE MEASURING DEVICE

Edgar J. Meyer and Howard A. Maier, Buffalo, N. Y., assignors to American Optical Company, Southbridge, Mass., a voluntary association of Massachusetts Application March 25, 1953, Serial No. 344,504

12 Claims. (Cl. 88—14)

This invention relates to optical measuring devices and more especially the invention has particular reference to devices for inspecting and measuring the inner contours and interior dimensions of wire drawing dies and the like.

In ordinary wire drawing processes employing carbide dies, and the like, the entrance angle of the die-hole or the angle of taper thereof is exceedingly important for high quality and accuracy during wire production, and accordingly to be able to readily ascertain the dimensions and surface conditions of the die-hole is most desirable. Both the angle of taper and the entrance angle of the smoothing-out section of the die-hole of a wire drawing die are positioned internally of the die and are therefore extremely difficult to measure with any degree of accuracy by ordinary mechanical means such as conical feeler gauges, plug gauges or the like. The angle of taper of the smoothing-out (frustro-conical) section of a wire drawing die is the angle which is included between an elemental straight side wall portion of the section and the axis of the section. The entrance angle, on the other hand, is the total angle included between diametrically opposite elemental straight side wall portions of the smoothing-out section. Thus it will be readily appreciable that by measuring one of these angles the other may be readily obtained.

The present invention relates to a device or instrument of special construction and arrangement wherein the desired measurements and inspection mentioned above may be obtained with the advantages of high accuracy and precision obtainable only with optical measuring techniques. This high accuracy is accomplished by projecting a substantially parallel beam of light into the die-hole of a wire drawing die being inspected along the axis of the die-hole with the result that some of the light of the beam will be reflected from mirror-like surfaces of the frustro-conical wall portion or portions of the die forming the tapered smoothing-out section. This reflected light passes out through the exit of said die-hole and onto an associated screen as a hollow cone or cones of light any longitudinal section of which will have an angular relation to the axis of the die-hole which is indicative of the angular value of the related tapered wall. The angle of the reflected light for any longitudinal section, in relation to the axis of the die-hole, is then measured by the use of optical means of the device by measuring the amount of deflection thereof in a manner which will be more fully described hereinafter.

A principal object of the present invention is to provide a compact, efficient and highly accurate self-contained optical measuring and inspecting device by means of which the entrance angles of the die-holes in wire drawing dies may be measured and inspected without requiring hard-to-make measurements or lengthy mathematical calculations.

Another object of the invention is the provision of such a die measuring and inspecting instrument which may be readily moved about in an industrial plant to different locations of use therein.

Another object of the invention is to provide a self-contained device of the above nature wherein the desired die angle measurements may be made and the resulting values indicated directly upon a direct reading scale on the instrument.

A further object of the invention is to provide in such a die measuring and inspecting device a die support and holding means therefor which may be readily and conveniently adjusted to position the axis of the die-hole in correct alignment with the axis of the light projecting system of the instrument and thus into such a position that the axis of the die-hole will be normal to the associated viewing screen of the instrument. Means for adjusting the die support into predetermined measuring positions along the axis is also provided.

Another object is to provide in such a die inspecting and measuring instrument means whereby the operator of the device will have unrestricted vision of a large portion of the viewing screen while adjustment of the die supporting means into proper alignment is being made.

A further object of the invention is to provide in a device of the character described sighting means incorporating a magnifying lens system and a reticule arranged so that the operator may obtain precise setting of a scale operatively associated therewith with relation to a circle or circles of light being projected onto the viewing screen.

Another object of the present invention is to provide in a die measuring device controllable means whereby different sizes of light beams may be projected onto dies of different sizes which are to be measured by the device.

Other objects and advantages of the invention will be apparent from the detailed description which follows when taken in connection with the accompanying drawings. It will be understood, however, that many changes may be made in the construction and arrangement of parts without departing from the spirit of the invention as expressed in the accompanying claims.

Referring to the drawings:

Fig. 1 is a top plan view of a die inspecting and measuring device embodying the invention;

Fig. 2 is a front elevational view of the device of Fig. 1, but with certain parts thereof broken away and with other parts thereof being shown in section;

Fig. 3 is an enlarged sectional view of the device taken substantially along lines 3—3 of Fig. 1 and looking in the direction of the arrows;

Fig. 4 is a fragmentary sectional view as taken substantially on line 4—4 of Fig. 3 and looking in the direction of the arrows;

Fig. 5 is a sectional view taken substantially on line 5—5 of Fig. 2;

Fig. 6 is an enlarged fragmentary sectional view taken substantially on line 6—6 of Fig. 1;

Fig. 7 is an exploded view of a scale and scale locking mechanism shown in Figs. 1 and 6;

Fig. 8 is an enlarged fragmentary sectional view taken substantially on line 8—8 of Fig. 1 and looking in the direction of the arrows;

Fig. 9 is an enlarged fragmentary end view of the scale and scale locking mechanism of Fig. 1;

Fig. 10 is a diagrammatic view showing principles of operation of the device; and Fig. 11 is an enlarged fragmentary view taken substantially on line 11—11 of Fig. 1.

Referring to the drawings in detail and particularly to Figs. 1 and 2 it will be seen that the device generally indicated by numeral 10 and embodying the invention comprises a hollow main housing or casing 11 which is formed by top, side, rear and bottom walls 12, 13A, 13B, 14 and 15, respectively, and is provided with a detachable front wall or cover 16 secured to housing 11 by means of the screws 17 or the like. Preferably the hollow casing 11 is formed as a single cast metal unit and thus forms a very sturdy supporting structure. The casing is provided with resilient buttons or feet 18 secured to corners of the bottom wall 15.

The detachable front wall 16 is provided with a relatively large opening 19 in an upper part thereof through which an operator may reach to position a wire drawing die 20 or the like in proper position to be measured or inspected by the instrument. Within the casing 11 there is provided an adjustable die-supporting structure, generally indicated by numeral 21, which is slidably mounted for vertical movement in a supporting bracket 22. Bracket 22 comprises a vertically disposed forwardly extending plate-like portion 22A of appreciable height and width and a flanged portion 22B adjacent its rear, bottom and top edges so that the bracket may be firmly secured to the rear wall 14 of casing 11 (see also Fig. 5) by the screws 23 and form a sturdy construction. The supporting bracket 22 is provided with a pair of angled gibs 24 secured in spaced relation on plate-like portion 22A by the screws 25 to form a dove tail slideway for a main carrier 26 for the die-support structure 21 which has a slide portion 27 thereof provided with angled side edges 28 slidably fitting with the vertically extending gibs 24 in known manner whereby the die-supporting structure 21 may be vertically guided within the casing 11.

For adjusting the main carrier 26 vertically the slide portion 27 of the carrier is provided with an integral boss 29 projecting from a side thereof and which extends through a vertically elongated opening 30 in the supporting bracket 22. The boss 29 has secured to its outer end a U-shaped strap 31 which has its bight portion 31A extending sufficiently below the boss to provide a confining pocket in which an actuating pin 32 is adapted to move. The opposite ends of the U-shaped strap are secured to the boss 29 by the screws 33.

The actuating pin 32 is secured to an actuating arm or lever 34 which is attached to a shaft 35 by a pin 36 so as to pivot therewith. The shaft 35 extends through an opening in the wall 13B of the casing 11 and an actuating knob 37 is secured to the opposed end of the shaft by a pin, set screw or the like, 38. To obtain smooth operation of the actuating shaft and associated mechanism there is provided a relatively wide bearing 39 between the wall of the casing and the knob and this bearing is firmly secured to the wall 13B preferably by a plurality of screws 40 (only one of which is shown). The bearing 39 has a reduced portion 41 extending into the opening in wall 13B to provide a longer bearing surface for the shaft 35.

The actuating knob 37, through the lever 34, and actuating pin 32, is adapted to slide the main carrier 26 of the die-supporting structure 21 vertically along the gibs 24 so as to position the structure 21 in one or other of two operative positions spaced a definite predetermined distance apart during the measuring operations. To insure the positive positioning and spacing of the die-supporting structure 21 in these positions there is provided at the upper end of the supporting bracket 22 an adjustable stop 42 (see Fig. 4) which is adapted to be positioned within the elongated opening 30, where it will be contacted by the boss 29. The stop 42 is arranged to be vertically adjusted to a proper position by a supporting screw 43. The stop determines the upper position of the die-supporting structure 21 with reference to its lower position. On the other hand, the lower position is established by the lower edge of the slide 27 contacting a stop plate 44 secured to the lower end of supporting bracket 22.

The die-supporting structure 21, when moved to either of its operative positions will be held firmly in place by means of an elongated coiled spring 45 (see Fig. 3) which is secured at one end to a pin 47 projecting from a boss 46 on the actuating lever 34 and at its opposed end to a lower part of the casing 11 by means of a pin or the like 48. It will be seen in Fig. 3 that the boss 46 is so positioned in relation to the center of the actuating shaft 35 about which the lever 34 is pivoted that the spring will exert a pull on one side of the pivot or the other side thereof depending in which position the structure 21 is placed. This arrangement, in effect, serves as a toggle mechanism always urging the structure upwardly or downwardly as the case may be.

The main carrier 26 of the die-supporting structure 21 is provided with a flat table portion 49 extending substantially horizontally from the slide portion 27 thereof and is strengthened by a gusset portion 49A extending therebetween. The table portion 49 is of substantial area and is positioned substantially centrally of the casing 11.

A stage 50 is disposed above and carried by the table portion 49 of the die-supporting structure 21 when the structure is moved into the upper or lower operative positions. The stage 50 should and is adapted to properly support, as will be presently described, a wire drawing die or the like with the axis of the aperture therein extending vertically during examination or measurement thereof by the device. Means for accomplishing this axis adjustment is provided by rockably supporting the stage 50 upon the upper rounded end of a fixed pin 51A secured centrally adjacent the rear edge of the table portion 49. A pair of spaced adjustable pins 51B serve to support the forward edge of the stage 50. Pins 51B are provided with threaded lower ends which are threadedly connected to the table portion 49. Each pin 51B has a knurled knob or finger contact means 54 for adjusting the table. The upper ends of pins 51B are likewise rounded and conically shaped countersinks 52 are provided in the under surface of stage 50 for receiving pins 51A and 51B. A tensioned coil spring 53 is connected to the table portion 49 and to the stage 50 adjacent each pin and thus either front corner or both of the stages may be adjusted by pins 51B while the rear edge thereof is held against the fixed pin 51A. This will allow the table to be rocked in any direction about the rounded end of pin 51A so as to position the axis of the opening in the die vertically within the device. Thus, if the die axis is not perfectly normal to the surface of the die which seats or supports the die on the die-supporting structure 21 adjustments may be easily and accurately made to correct the condition.

The stage 50 is provided with a central circular recess 55 in which a die receiving plate 56 is seated and secured by means of the screws 57. The die receiving plate 56 is provided with a centrally stepped aperture therethrough formed by a first circular recess 58A in which the die 20 is shown seated and a second smaller circular recess 58B. The reason for providing such a stepped or cut-out arrangement is that substantially all commercial wire drawing dies are provided with either one or the other of two different outside diameters, namely 1½ inch size or 1 inch size. Recess 58A will accommodate the first, 58B the second.

In order to releasably secure the die in place in its recess 58A or 58B, there is provided a bearing block 59 secured to a rear portion of the stage 50 by means of the screws 60. A shaft 61 is rotatably mounted in this bearing block and is provided with an actuating handle 62 secured to one end of the shaft. The bearing block 59 has a recess cut-out portion 63 formed in its upper edge which leaves an intermediate portion of the shaft 61 exposed. Mounted upon and secured to the exposed intermediate portion of the shaft 61 is a bifurcated member 64 which has forwardly extending fingers 65 adapted to contact diametrically spaced points of the upper surface of the die 20 and securely hold the die in the die seat 58A or 58B as the case may be. A spring pressure for urging the fingers 65 against the die 20 is provided by a coiled spring 66 which encircles the shaft 61 and has one end 67 thereof overlying the member 64 and the opposed end 68 pressing against the bearing 59, as shown in Fig. 3. By actuating the handle 62 fingers 65 may be raised away from the die and thus different dies may be quickly and easily placed in or removed from the device. The handle 62 also serves the useful purpose of indicating whether or not a die is properly seated in its recess, for the handle will not return to its lowermost position (indicated in Fig. 3) if a die is unseated in its recess.

Secured to the rear wall 14 of the main casing 11, by means not shown, is an auxiliary housing 69 in which a suitable low voltage lamp housing 70 is mounted. A substantially parallel beam of light emanating from a light source within housing 70 is directed downwardly along optical axis 70' toward an aperture 70A centrally located in a horizontal partition 70B in housing 69. The light which passes through this aperture 70A is reflected from a mirror 71 (preferably a front surface mirror) secured against a shouldered aperture 71A in the housing 69 by a threaded ring 71'. This reflected light is directed through an opening 72 in the casing 11 to a surface of a second (preferably front surface) mirror 73 within the main housing or casing 11. The mirror 73 is supported in a recess in a bracket 74 attached to the bottom wall 15 of the housing and is retained therein by a ring retainer 73'. This beam of light is then reflected upwardly through a relatively large opening 76 in the movable table portion 49, through a smaller opening 77 in the tiltable stage 50 and through the aperture in the die receiving plate 56 and to the opening in the die 20.

To control the size of the beam of light being projected to the die, there is provided in the auxiliary housing 69, a disc-like member 78 which is pivotally secured to the partition 70B by a screw 79 (see Figs. 3 and 8). This disc-like member is provided with a plurality of different size openings 80, 81 and 82, any one of which may be pivoted into axial alignment over aperture 70A, by actuating a handle 83 secured to a part of member 78 extending outwardly of the auxiliary housing 69 through a horizontal slot 69A formed therein. The desired opening 80, 81 or 82 may be held in position adjacent aperture 70A by means of a spring detent 84 or the like. An electric cord 85 serves to connect the light source 70 to a step down transformer 86 (see Figs. 1 and 5) and another electric cord 87 connects the transformer with a conventional source of alternating current.

A relatively large ground glass or equivalent translucent viewing screen 75 is horizontally supported within the casing 11 and at a suitable distance above the stage 50 by means of a supporting frame member 87, which is secured in fixed relation to the rear of the casing 11 by screws 88. The screen 75 is removably secured in place in a large aperture in the frame member 87 by means of a threaded ring 89. A conventional wire drawing die, such as die 20 (see Figs. 3 and 10), has a central opening or throat 20A therein and a generally frustro-conical entrance opening 20B communicating therewith. It will be readily apparent therefore that some of the light of the light beam projected toward the die 20 on the stage 50 will enter the die-hole and will pass directly therethrough and will form a bright spot of light 75A centrally upon the screen 75. Other portions of the light beam, however, will be reflected from the angled or sloping wall of the entrance opening 20B and will pass outwardly through the opposed end of the die and will strike the screen 75 angularly as indicated at 75B. This light from the sloping wall 20B will form a light annulus about the bright spot 75A. This projected light annulus forms the basis whereby the entrance angle or slope of the die entrance opening may be inspected and accurately measured.

Slidably mounted in the top 12 of the casing 11 is a main slide 90 which has angled sides 91 fitting on one side thereof into an angled portion 92 of the top wall and on the opposed side against an angled gib 93 which is removably secured to the top wall 12 by means of the screws 94. Carried by and adapted to cooperate with the main slide 90 is a scale slide 95 having flanged side edges, adapted to slidably fit at one side beneath a flanged wall 96 (see Fig. 6) of the main slide and at the opposite side beneath a flanged gib 97 which is removably secured to the gib 93 by the screws 98.

The scale slide 95 is provided with means 99 whereby it may be either clamped to and moved with the main slide 90 or be clamped to the gib 97 to be held stationary thereby. This clamping means 99 is clearly shown in exploded view Fig. 7, and consists of a flat plate 99A secured to the scale slide 95 by screw means 100. The flat plate is of a greater width than slide 95 and is provided with parallel slots adjacent its side edges, as shown at 101, thereby forming spring-like finger portions 102A and 102B which, as shown in Fig. 6, overlie the gib 97 on one side and the main slide 90 on the opposite side. Secured adjacent the free ends of the spring fingers is a pair of wedge members 103A and 103B. A C-shaped pressure plate 104 is secured intermediate its ends to a clamping knob 105 by screws 106 for movement therewith. Between the clamping knob 105 and the plate 104 there is shown a spacing plate 107. The plate 99A is provided with a vertically extending hub 108 for receiving and pivotally supporting the clamping knob 105 which is retained in place by a screw 109 threaded into the upper end of the hub. The construction of the C-shaped plate 104 is such that when the knob 105 is in its mid-position both wedge members 103A and 103B will be engaged and both slides 90 and 95 will be locked against movement. However, if the knob 105 is rotated its full amount clockwise, wedge 103B will continue to hold the scale slide 95 stationary but wedge 103A and finger 102A will release slide 90 for sliding movement. On the other hand, if the knob 105 is rotated counterclockwise its full amount in the opposite direction, the scale slide 95 will be released for movement relative to gib 97 even though it will still be locked to the main slide. At this time, accordingly, the main slide and scale slide may be moved together relative to the rest of the instrument.

From the foregoing description of the parts comprising the clamping means 99 it will be seen that by rotating the clamping knob 105 in a counter-clockwise direction, the pressure plate 104 will ride up onto the taper of the wedge 103A thereby forcing the associated spring finger 102A against the main slide 90 so that the scale slide 95 and the main slide will be clamped together. At such time the opposite wedge 103B will be unengaged. By rotating the clamping knob 105 clockwise, the plate 104 will contact the opposite wedge 103B and lock the scale slide 95 to the stationary gib 97. A pin 110 secured to and extending upwardly from the plate 99A is adapted to fit within a curved slot 111 (see Figs. 1 and 11) in the clamping knob 105 to limit the rotational movement thereof.

The main slide 90 is provided with finger gripping means 112 at each end thereof so that it may be easily manipulated laterally in either direction. A stop screw 113 (see Fig. 9) is carried by the main slide 90 and so positioned that the head portion thereof may be contacted by the scale slide 95. Thus, the scale slide 95 will be limited in its displacement toward the right and relative to the main slide by this screw 113. A scale 95A is engraved or otherwise provided upon a central part of the slide 95 and an index mark 114 on a small plate 115 positioned on the main slide is located in such a manner that the mark 114 will be opposite the zero of the scale 95A when screw 113 engages the scale slide. Small plate 115 is provided with oversize screw holes (not shown) so that it may be accurately aligned at zero position with the zero mark on the scale 95A. To prevent the spring finger 102B from being carried beyond the right end of the gib 97 there is provided a stop screw 115' located in gib 93 or 97 so that the head thereof will be contacted by the end of the scale slide 95 (see Fig. 9).

Sighting means is centrally carried by the main slide 90 and comprises a vertically extending tubular member 116 in the lower end of which is mounted a reticule 117, provided with a reference line 118 on the under side thereof (see Figs. 1 and 3) which extends in a direction at right angles to the direction of travel of the main slide 90. The reticule is positioned closely adjacent the ground glass screen 75 and is adapted to be aligned with different parts of the screen 75 lighted by light passing through a die on stage 50 when measurements and the like are being made. The tubular member or sighting tube 116 has an enlarged rim portion 119 adjacent its upper end which seats on a circular shoulder 120 formed in the slide 90. Sighting tube is held therein by a threaded eye piece mount 121 which is provided with a doublet magnifying lens 122 aligned with the reticule line 118 so that the operator of the device may see the reticule enlarged as well as a portion of the lighted screen 75 adjacent thereto. A fairly large window opening 123 is provided in the main slide 90 to one side of the sighting lens 122 so that the operator may conveniently view the screen 75 while adjusting the stage to level die 20. The die will be level, that is its axis will be normal to the screen 75, when the annulus of light 75B on the screen 75 appears concentric with reference to the central spot of light 75A thereon. The window 123 is provided with a cover 124 for closing the opening 123 when it is not being used. This prevents stray external light from falling on the screen 75, which would otherwise materially reduce the contrast of the light ring while measurements are being made.

The mathematical principles upon which the instrument or device of the present invention is based will now be described and may be readily understood by reference to the diagram of Fig. 10. (Even though no attempt has been made in Fig. 10 to accurately represent the size of the die opening at 20A, or the size of the entrance angle at 20B, or the distance between the upper and lower operative positions 125 and 127 of the die, or the distance from the upper die position to the screen 75 in true dimensions or proportions, the underlying principles of the invention are clearly presented.)

From Fig. 10, it will be seen that the entrance angle of the smoothing-out section 20B of the die may be represented by the letter $\theta$. (The angle of taper, it will be recalled, is one-half this angle.) Light being reflected from diametrically opposed surface portions of section 20B, when the die is properly leveled on the stage 50 and is in its lower position 125, will travel obliquely toward the screen 75 as a cone of light 20C and will form thereon the large light annulus 75B already mentioned. This annulus will be substantially concentric with the central spot 75A and will have a radius equal to that indicated at $R_1$. However, when the die is moved through a distance $d$ to its upper operative position 127, the reflected cone of light from the surface 20B will form a smaller light annulus as indicated at 75C which is also concentric with the spot 75A and which has a radius equal to $R_2$.

It can readily be shown that the angle included between the optical axis and any light ray being reflected from the surface of the smoothing-out section 20B is equal to the entrance angle. Thus we may take the angle E as equal to angle $\theta$. If a line 132 is drawn from a selected ray point in the inner light annulus on the screen 75 and parallel to the optical axis to the position the light ray forming this ray point would occupy when forming the larger annulus on the screen, the included angle F will be of equal value to E and $\theta$. Thus a right triangle will be formed whose base is equal to the radius $R_1$ minus the radius $R_2$ and whose altitude (line 132) is equal to the vertical displacement $d$ of the die. Therefore, the following formula can be written:

$$\tan \theta = \frac{R_1 - R_2}{d}$$

or $$R_1 - R_2 = d \tan \theta$$

Since the vertical displacement $d$ is already established by the mechanics of the device and will be the same for all dies being inspected, it can be taken as equal to one unit of measure and the scale 95A on the scale slide 95 may be provided with graduations which will read in numerical values for the tangent of the angle $\theta$, or directly in degrees for the angle $\theta$, or in some other convenient units.

When the device is to be used for measuring and inspecting dies, the die is placed upon the die supporting stage 50 and the stage is adjusted to align the axis of the die opening 20A with the optical axis of the projected beam of light. The stage at this time will be in its lower position. The clamping knob 105 is then turned clockwise to clamp the scale slide 95 to the stationary gib 97. The main slide 90 may then be moved to the left independently of the scale slide until the stop screw 113 on the main slide abuts the scale slide 95. This will place the index mark 114 opposite the "zero" mark on the scale 95A. The clamping knob 105 is then rotated counter-clockwise, to release the scale slide from the gib 97 and to clamp the scale slide 95 to the main slide 90.

The main slide and scale slide may then be moved together to the left until the reference line 118 of the reticule is tangent to a selected point on the larger light circle or annulus 75B (such as a point on the inside edge of this annulus). This will set the "zero" mark of the scale in a vertical fore-and-aft plane passing through the selected point and may be considered as the first measuring step in a method of use of the instrument. As a second step, the clamping knob 105 is then rotated clockwise to clamp the scale slide 95 to the gib 97, and then the main slide 90, carrying the reference mark 114 and reticule 118, may be moved to position the reticule in tangential relation with a similar inside point on the opposite inner edge of the larger light circle 75B. The die supporting stage 21 is then raised to its upper operative position by the actuating knob 37, whereupon the smaller annulus of light, indicated at 75C in Fig. 10, will be projected upon the screen 75.

As the next step, the clamping knob 105 is rotated counter-clockwise to again clamp the scale slide 95 to the main slide 90, and then the main slide is moved to the left until the reticule line 118 is tangent with the right hand inner edge of the smaller light annulus 75C. Thereafter the knob 105 is rotated clockwise to clamp scale slide 95 to gib 97. Then as a final step the main slide 90 is moved to the left until the reference line 118 is tangent with the inner edge of the smaller annulus 75C. The index mark 114 will then give upon the scale 95A a reading for the value of the die angle being measured.

This series of steps will cause the index mark 114 to move from "zero" first along the scale an amount equal to the inner diameter of the larger light annulus 75B on the screen, and then this scale value will be reduced by an amount equal to the inner diameter of the smaller light annulus 75C. The index mark 114 will then indicate on the scale a distance which is equal to the difference in the diameters of the larger and smaller light annuli; and since the vertical travel $d$ of the die is always the same, values for the tangent of twice the entrance angle of the smoothing-out section 20B of the die hole will be indicated directly upon the scale 95A, and the value of $\theta$ may be had therefrom.

While the method of use of the instrument has been described above using an "inside" tangential point as the selected point in each alignment step for line 118, the method could be performed as well using for each such step an "outside" tangential point, if such were preferred. The important thing to bear in mind, however, in every set of measurements is that the selected point, be the same, whether it be selected as inside or outside; in order that the die angle will be accurately measured.

While the main purpose of this device is to accurately measure the angle of slope of the opening in the die, it will also serve as a check as to the conditions of this opening, such as rough surfaces, multiple angles or oval periphery. These conditions will be shown, respectively, by the nature of the brightness of different parts of the reflected annulus on the screen 75, by the presence of two or more spaced annuli at any setting or the "spreading-out" of the light which would normally form the light annulus were a correctly formed die being inspected, and by the light annulus on the screen being of non-circular shape. These conditions may be readily observed and examined through the observation opening 123 when the cover 124 is pivoted to an out-of-the-way position. An advantage to be had by the use of the instrument of the present invention over earlier methods of die inspection and measurements, is that all measurements and inspection of dies are optical and thus may be made without danger of injury thereto.

From the foregoing description it will be seen that we have shown and described a specific embodiment of an optical die measuring and inspecting device embodying the invention. It is obvious that modifications thereof are possible and accordingly we do not wish to restrict the invention except as required by the appended claims.

We claim:

1. A readily portable angle measuring device comprising a rigid housing, a viewing screen in relatively fixed relation within said housing and so positioned therein as to be shielded from external light, a stage within said housing for supporting an object having angularly related surfaces the included angle between which is to be measured, means mounting said stage for movement along a predetermined optical axis disposed in substantially normal relation to said screen, means on said stage for retaining said object substantially in alignment with said optical axis, manually operable means for selectively moving said stage along said optical axis to position said object in either of two operative positions spaced a predetermined distance apart, resilient means connected to said manually operable means for yieldably retaining said stage in either of said operative positions, means directing a small substantially parallel beam of light along said optical axis and toward said stage so as to impinge upon said angularly related surfaces on said object and be reflected thereby onto said viewing screen, whereby a pair of small illuminated areas will be produced upon said screen spaced from each other when said object is in one of said operative positions and said pair of small illuminated areas will be spaced a different amount from each other upon said screen when said object is in the other of said operative positions, and laterally slidable sighting means carried by said housing and adapted to be positioned in operative relation to different parts of said screen for measuring the distances between said illuminated areas upon said screen.

2. A readily portable die angle measuring device comprising a rigid housing, a viewing screen in relatively fixed relation within said housing and so positioned therein as to be shielded from external light, a stage within said housing for supporting a die having a central opening therein and angularly related surface portions communicating therewith and constituting a tapered smoothing-out section the included entrance angle of which is to be measured, means mounting said stage for movement along a predetermined optical axis disposed in substantially normal relation to said screen, means on said stage for retaining the central opening in said die substantially in alignment with said optical axis, manually operable means for selectively moving said stage along said optical axis to position said die in either of two operative positions spaced a predetermined distance apart, resilient means connected to said manually operable means for yieldably retaining said stage in either of said operative positions, means directing a small substantially parallel beam of light along said optical axis toward said stage so as to impinge upon said angularly related surface portions of said smoothing-out section of said die and be reflected thereby onto said viewing screen, whereby a pair of small diametrically spaced illuminated areas will be provided upon said screen when said die is in one of said operative positions and said pair of small diametrically spaced illuminated areas will be spaced a different amount from each other upon said screen when the die is in the other of said operative positions, and laterally slidable sighting means carried by said housing and adapted to be positioned in operative relation to different parts of said screen for measuring the distance between said illuminated areas upon said viewing screen.

3. A readily portable angle measuring device comprising a rigid housing, a viewing screen in relatively fixed relation within said housing and so positioned therein as to be shielded from external light, a stage within said housing for supporting an object having angularly related surfaces the included angle between which is to be measured, means mounting said stage for movement along a predetermined optical axis disposed in substantially normal relation to said screen, means associated with said stage for adjusting a preselected center line of said object into substantial alignment with said optical axis, means on said stage for retaining said object with its center line substantially in said alignment, manually operable means for selectively moving said stage along said optical axis to position said object in either of two operative positions spaced a predetermined distance apart, resilient means connected to said manually operable means for yieldably retaining said stage in either of said operative positions, means directing a small substantially parallel beam of light along said optical axis and toward said stage so as to impinge upon said angularly related surfaces on said object and be reflected thereby onto said viewing screen, whereby a pair of small illuminated areas will be produced upon said screen spaced from each other when said object is in one of said operative positions and said pair of small illuminated areas will be spaced a different amount from each other upon said screen when said object is in the other of said operative positions, and laterally slidable sighting means carried by said housing and adapted to be positioned in operative relation to different parts of said screen for measuring the distances between said illuminated areas upon said screen.

4. A readily portable die angle measuring device comprising a rigid housing, a viewing screen in relatively fixed relation within said housing and so positioned therein as to be shielded from external light, a stage within said housing for supporting a die having a central opening therein and angularly related surface portions communicating therewith and constituting a tapered smoothing-out section the included entrance angle of which is to be measured, means mounting said stage for movement along a predetermined optical axis disposed in substantially normal relation to said screen, means associated with said stage for adjusting the axis of said central opening of said die into substantial alignment with said optical axis, means on said stage for retaining said die with its axis substantially in said alignment, manually operable means for selectively moving said stage along said optical axis to position said die in either of two operative positions spaced a predetermined distance apart, resilient means connected to said manually operable means for yieldably retaining said stage in either of said operative positions, means directing a small substantially parallel beam of light along said optical axis toward said stage so as to impinge upon said angularly related surface portions of said smoothing-out section of said die and be reflected thereby onto said viewing screen, whereby a pair of small diametrically spaced illuminated areas will be provided upon said screen when said die is in one of said operative positions and said pair of small diametrically spaced illuminated areas will be spaced a different amount from each other upon said screen when the die is in the other of said operative positions, and laterally slidable sighting means carried by said housing and adapted to be positioned in operative relation to different parts of said screen for measuring the distance between said illuminated areas upon said viewing screen.

5. A readily portable angle measuring device comprising a rigid housing, a translucent viewing screen in relatively fixed relation within said housing and so positioned therein as to be shielded from external light, a stage within said housing beneath said screen for supporting an object having angularly related surfaces the included angle between which is to be measured, means mounting said stage for movement along a predetermined vertically extending optical axle disposed in substantially normal relation to said screen, means on said stage for retaining a preselected point on said object substantially in alignment with said optical axis, manually operable means extending outwardly through a side wall of said housing for selectively moving said stage along said optical axis to position said object in either of two operative positions spaced a small predetermined vertical distance apart, resilient means connected to said manually operable means for yieldably retaining said stage in either of said operative positions, means directing a small substantially parallel beam of light along said optical axis and toward said stage so as to impinge upon said angularly related surfaces on said object and be reflected thereby onto said viewing screen, whereby a pair of small illuminated areas spaced from each other will be produced upon said screen when said object is in one of said operative positions and said pair of small illuminated areas will be spaced a different amount from each other upon said screen when said object is in the other of said operative positions, and sighting means slidably carried by a top wall of said housing and arranged to be moved laterally in the direction of the spacing of said illuminated areas so as to be positioned in operative relation adjacent different portions of said screen for accurately measuring the distances between said illuminated areas upon said screen.

6. A readily portable die angle measuring device comprising a rigid housing, a translucent viewing screen in relatively fixed relation within said housing and so positioned therein as to be shielded from external light, a stage within said housing beneath said screen for supporting a die having a central opening therein and angularly related surface portions communicating therewith and constituting a tapered smoothing-out section the included entrance angle of which is to be measured, means mounting said stage for movement along a predetermined vertically extending optical axis disposed in substantially normal relation to said screen, means on said stage for retaining the central opening in said die substantially in alignment with said optical axis, manually operable means extending outwardly through a side wall of said housing for selectively moving said stage along said optical axis to position said die in either of two operative positions spaced a small predetermined vertical distance apart, resilient means connected to said manually operable means for yieldably retaining said stage in either of said operative positions, means directing a small substantially parallel beam of light along said optical axis toward said stage so as to impinge upon said angularly related surface portions of said smoothing-out section of said die and be reflected thereby onto said viewing screen, whereby a pair of small diametrically spaced illuminated areas will be provided upon said screen when said die is in one of said operative positions and said pair of small diametrically spaced illuminated areas will be spaced a different amount from each other upon said screen when the die is in the other of said operative positions, and sighting means slidably carried by a top wall of said housing and arranged to be moved laterally in the direction of the spacing of said illuminated areas so as to be positioned in operative relation adjacent different portions of said screen for accurately measuring the distance between said illuminated areas upon said viewing screen.

7. A readily portable angle measuring device comprising a rigid housing, a viewing screen in relatively fixed relation within said housing and so positioned therein as to be shielded from external light, a stage within said housing for supporting an object having angularly related surfaces the included angle between which is to be measured, means mounting said stage for movement along a predetermined vertically extending optical axis disposed in substantially normal relation to said screen, means on said stage for retaining said object substantially in alignment with said optical axis, manually operable means for selectively moving said stage along said optical axis to position said object in either of two operative positions spaced a predetermined vertical distance apart, resilient means connected to said manually operable means for yieldably retaining said stage in either of said operative positions, means directing a small substantially parallel beam of light along said optical axis and toward said stage so as to impinge upon said angularly related surfaces on said object and be reflected thereby onto said viewing screen, whereby a pair of small illuminated areas will be produced upon said screen spaced from each other when said object is in one of said operative positions and said pair of small illuminated areas will be spaced a different amount from each other upon said screen when said object is in the other of said operative positions, a first laterally slidable means carried by a top wall of said housing, sighting means carried by said slidable means and arranged to be moved in the direction of the spacing of said illuminated areas so as to be positioned in operative relation adjacent different portions of said screen when lighted by said illuminated areas, and a second laterally slidable means carried by said top wall and movable in a direction parallel to said first slidable means, and displacement indicating means carried by each of said slidable means for indicating amounts of relative displacement therebetween.

8. A readily portable die angle measuring device comprising a rigid housing, a viewing screen in relatively fixed relation within said housing and so positioned therein as to be shielded from external light, a stage within said housing for supporting a die having a central opening therein and angularly related surface portions communicating therewith and constituting a tapered smoothing-out section the included entrance angle of which is to be measured, means mounting said stage for movement along a predetermined vertically disposed optical axis disposed in substantially normal relation to said screen, means on said stage for retaining the central opening in said die substantially in alignment with said optical axis, manually operable means for selectively moving said stage along said optical axis to position said die in either of two operative positions spaced a predetermined vertical distance apart, resilient means connected to said manually operable means for yieldably retaining said stage in either of said operative positions, means directing a small substantially parallel beam of light along said optical axis toward said stage so as to impinge upon said angularly related surface portions of said smoothing-out section of said die and be reflected thereby onto said viewing screen, whereby a pair of small diametrically spaced illuminated areas will be provided upon said screen when said die is in one of said operative positions and said pair of small diametrically spaced illuminated areas will be spaced a different amount from each other upon said screen when the die is in the other of said operative positions, a first laterally slidable means carried by a top wall of said housing, sighting means carried by said slidable means and arranged to be moved in the direction of the spacing of said illuminated areas so as to be positioned in operative relation adjacent different portions of said screen when lighted by said illuminated areas, and a second laterally slidable means carried by said top wall and movable in a direction parallel to said first slidable means, and displacement indicating means carried by each of said slidable means for indicating amounts of relative displacement therebetween.

9. A readily portable angle measuring device comprising a rigid housing, a viewing screen in relatively fixed relation within said housing and so positioned therein as to be shielded from external light, a stage within said housing for supporting an object having angularly related surfaces the included angle between which is to be measured, means mounting said stage for movement along a predetermined vertically extending optical axis disposed in substantially normal relation to said screen, means on said stage for retaining said object substantially in alignment with said optical axis, manually operable means for selectively moving said stage along said optical axis to position said object in either of two operative positions spaced a predetermined vertical distance apart, resilient means connected to said manually operable means for yieldably retaining said stage in either of said operative positions, means directing a small substantially parallel beam of light along said optical axis and toward said stage so as to impinge upon said angularly related surfaces on said object and be reflected thereby onto said viewing screen, whereby a pair of small illuminated areas will be produced upon said screen spaced from each other when said object is in one of said operative positions and said pair of small illuminated areas will be spaced a different amount from each other upon said screen when said object is in the other of said operative positions, a first laterally slidable means carried by a top wall of said housing and having alignment means supported thereby arranged to be moved in the direction of the spacing of said illuminated areas so as to be positioned in operative relation adjacent different portions of said screen when lighted by said illuminated areas, a second laterally slidable means carried by said top wall and movable in a direction parallel to said first slidable means, displacement indicating means carried by each of said slidable means for indicating amounts of relative displacement therebetween, and optical sighting means positioned above said alignment means and arranged to provide an enlarged image of said alignment means and any adjacent illuminated area of said screen in all operative positions thereof.

10. A readily portable die angle measuring device comprising a rigid housing, a viewing screen in relatively fixed relation within said housing and so positioned therein as to be shielded from external light, a stage within said housing for supporting a die having a central opening therein and angularly related surface portions communicating therewith and constituting a tapered smoothing-out section the included entrance angle of which is to be measured, means mounting said stage for movement along a predetermined vertically disposed optical axis disposed in substantially normal relation to said screen, means on said stage for retaining the central opening in said die substantially in alignment with said optical axis, manually operable means for selectively moving said stage along said optical axis to position said die in either of two operative positions spaced a predetermined vertical distance apart, resilient means connected to said manually operable means for yieldably retaining said stage in either of said operative positions, means directing a small substantially parallel beam of light along said optical axis toward said stage so as to impinge upon said angularly related surface portions of said smoothing-out section of said die and be reflected thereby onto said viewing screen, whereby a pair of small diametrically spaced illuminated areas will be provided upon said screen when said die is in one of said operative positions and said pair of small diametrically spaced illuminated areas will be spaced a different amount from each other upon said screen when the die is in the other of said operative positions, a first laterally slidable means carried by a top wall of said housing and having alignment means supported thereby arranged to be moved in the direction of the spacing of said illuminated areas so as to be positioned in operative relation adjacent different portions of said screen when lighted by said illuminated areas, a second laterally slidable means carried by said top wall and movable in a direction parallel to said first slidable means, displacement indicating means carried by each of said slidable means for indicating amounts of relative displacement therebetween, and optical sighting means positioned above said alignment means and arranged to provide an enlarged image of said alignment means and any adjacent illuminated area of said screen in all operative positions thereof.

11. A readily portable angle measuring device comprising a rigid housing, a viewing screen in relatively fixed relation within said housing and so positioned therein as to be shielded from external light, a stage within said housing for supporting an object having angularly related surfaces the included angle between which is to be measured, means mounting said stage for movement along a predetermined vertically extending optical axis disposed in substantially normal relation to said screen, means on said stage for retaining said object substantially in alignment with said optical axis, manually operable means for selectively moving said stage along said optical axis to position said object in either of two operative positions spaced a predetermined vertical distance apart, resilient means connected to said manually operable means for yieldably retaining said stage in either of said operable positions, means directing a small substantially parallel beam of light along said optical axis and toward said stage so as to impinge upon said angularly related surfaces on said object and be reflected thereby onto said viewing screen, whereby a pair of small illuminated areas will be produced upon said screen spaced from each other when said object is in one of said operative positions and said pair of small illuminated areas will be spaced a different amount from each other upon said screen when said object is in the other of said operative positions, a first laterally slidable means carried by a top wall of said housing and having alignment means supported thereby arranged to be moved in the direction of the spacing of said illuminated areas so as to be positioned in operative relation adjacent different portions of said screen when lighted by said illuminated areas, a second laterally slidable means carried by said top wall and movable in a direction parallel to said first slidable means, displacement indicating means carried by each of said slidable means for indicating amounts of relative displacement therebetween, and locking means carried by said second slidable means and selectively movable into a first position for locking said second slidable means in fixed relation to said top wall and into a second position for locking said first slidable means in fixed relation to said second slidable means.

12. A readily portable die angle measuring device comprising a rigid housing, a viewing screen in relatively fixed relation within said housing and so positioned therein as to be shielded from external light, a stage within said housing for supporting a die having a central opening therein and angularly related surface portions communicating therewith and constituting a tapered smoothing-out section the included entrance angle of which is to be measured, means mounting said stage for movement along a predetermined vertically disposed optical axis disposed in substantially normal relation to said screen, means on said stage for retaining the central opening in said die substantially in alignment with said optical axis, manually operable means for selectively moving said stage along said optical axis to position said die in either of two operative positions spaced a predetermined vertical distance apart, resilient means connected to said manually operable means for yieldably retaining said stage in either of said operative positions, means directing a small substantially parallel beam of light along said optical axis toward said stage so as to impinge upon said angularly related surface portions of said smoothing-out section of said die and be reflected thereby onto said viewing screen, whereby a pair of small diametrically spaced illuminated areas will be provided upon said screen when said die is in one of said operative positions and said pair of small diametrically spaced illuminated areas will be spaced a different amount from each other upon said screen when the die is in the other of said operative positions, a first laterally slidable means carried by a top wall of said housing and having alignment means supported thereby arranged to be moved in the direction of the spacing of said illuminated areas so as to be positioned in operative relation adjacent different portions of said screen when lighted by said illuminated areas, a second laterally slidable means carried by said top wall and movable in a direction parallel to said first slidable means, displacement indicating means carried by each of said slidable means for indicating amounts of relative displacement therebetween, and locking means carried by said second slidable means and selectively movable into a first position for locking said second slidable means in fixed relation to said top wall and into a second position for locking said first slidable means in fixed relation to said second slidable means.

References Cited in the file of this patent
UNITED STATES PATENTS

| | | |
|---|---|---|
| 1,761,260 | Gallasch | June 3, 1930 |
| 2,444,639 | Elder | July 6, 1948 |